United States Patent
Matey et al.

(10) Patent No.: US 6,187,487 B1
(45) Date of Patent: Feb. 13, 2001

(54) METHOD OF DEVELOPING A LATENT CHARGE IMAGE

(76) Inventors: James Regis Matey, 178 N. Hamilton Ave., Mercerville, NJ (US) 08619; Eugene Samuel Poliniak, 13 Grover La., Willingboro, NJ (US) 08046; Brian Thomas Collins, 442 S. Spruce St., Lititz, PA (US) 17543; Peter Michael Ritt, 2356 Split-Rail Dr., East Petersburg, PA (US) 17520

( * ) Notice: Under 35 U.S.C. 154(b), the term of this patent shall be extended for 0 days.

(21) Appl. No.: 09/485,837

(22) PCT Filed: Sep. 8, 1997

(86) PCT No.: PCT/US97/15824

§ 371 Date: Feb. 16, 2000

§ 102(e) Date: Feb. 16, 2000

(87) PCT Pub. No.: WO99/13485

PCT Pub. Date: Mar. 18, 1999

(51) Int. Cl.[7] ....................................... H01J 9/227
(52) U.S. Cl. .................. 430/23; 427/469; 427/71
(58) Field of Search ................... 430/23, 26, 28; 427/469, 475, 476, 68, 71, 157

(56) References Cited

U.S. PATENT DOCUMENTS

| 3,558,310 | 1/1971 | Mayaud | 96/36.1 |
|---|---|---|---|
| 4,921,767 | 5/1990 | Datta et al. | 430/23 |
| 5,093,217 | 3/1992 | Datta et al. | 430/28 |
| 5,151,337 | 9/1992 | Wetzel et al. | 430/28 |
| 5,370,952 | 12/1994 | Datta et al. | 430/28 |
| 5,477,285 | 12/1995 | Riddle et al. | 354/1 |
| 5,519,217 | 5/1996 | Wilbur, Jr. et al. | 250/326 |
| 5,637,357 * | 6/1997 | Stachelhaus et al. | 427/476 |
| 5,790,913 | 8/1998 | Roberts, Jr. et al. | 396/546 |
| 6,007,952 * | 12/1999 | Ciampa et al. | 430/23 |

FOREIGN PATENT DOCUMENTS 647595   4/1995   (EP) .

* cited by examiner

*Primary Examiner*—John A. McPherson
(74) *Attorney, Agent, or Firm*—Joseph S. Tripoli; Dennis H. Irlbeck

(57) ABSTRACT

A method for developing an electrostatic latent charge image formed on a photoreceptor 36 which is disposed on an interior surface of a faceplate panel 12 of a CRT 10 utilizes a developer 40 having a developing chamber 42 with a sidewall 50 closed by a bottom end 44 and a panel support 46 at the other end. An opening 48 is formed through the panel support 46 to provide access to and support for the faceplate panel 12. A panel grid 74 is disposed in proximity to said interior surface of said faceplate panel 12 and operated at a first potential to control the electric field from the latent charge image. A tank grid 56 is disposed within said developer 40 and spaced from the sidewall 50, the bottom 44 and the panel grid 74. A triboelectric gun 84 is disposed within the developer 40 for imparting a desired charge polarity to the screen structure material and for distributing the charged screen structure material onto the latent charge image. An electrometer 66 and a phosphor deposition monitor 90 monitor the deposition of the charged screen structure material onto the latent charge image; and a controller 68 terminates the deposition of the charged screen structure material when sufficient material is deposited. The Tank grid 56 is operated at a potential different from the potential on the panel grid 74 so that the tank grid 56 controls the electrostatic forces within the developer 40.

4 Claims, 2 Drawing Sheets

METHOD OF DEVELOPING A LATENT CHARGE IMAGE

The invention relates to a method of developing a latent charge image on a photoreceptor which is disposed on an interior surface of a faceplate of a cathode-ray tube (CRT), and, more particularly, to a method of operating a tank grid to control the electrostatic forces within a developing apparatus.

BACKGROUND OF THE INVENTION

An apparatus for developing a latent charge image on a photoreceptor that is disposed on an interior surface of a viewing faceplate of a display device, such as a cathode-ray tube (CRT), using triboelectrically charged particles, is described in U.S. Pat. No. 5,477,285, issued on Dec. 19, 1995, to G. H. N. Riddle et al. In a first embodiment of the developing apparatus, a developing chamber having insulating sidewalls and an insulative panel support is described. A triboelectric gun for directing charged screen structure material onto a photoreceptor provided on the interior surface of the CRT faceplate panel is disposed within the developing chamber. A drawback of the developing chamber is that the electrostatically charged screen structure material creates a charge buildup on the insulating sidewalls. The electrostatic forces from the sidewalls are not well controlled and the forces vary as the charge varies. For example, when the developing chamber is cleaned, to remove excess screen structure materials from the sidewalls, the electrostatic charge decreases. The electrostatic forces also vary when the humidity changes. Variations of 500 to 5000 volts have been recorded in the measured electrostatic fields of an operating developing chamber. In another embodiment of a developing chamber described in the above-referenced U.S. Pat. No. 5,477,285, an interior chamber of conductive material, comprising a sidewall and a bottom, is disposed within the developing chamber. The conductive interior chamber is electrically floating and attracts excess screen structure material out of the powder cloud generated within the chamber by the triboelectric gun, thereby preventing both a buildup of space charge within the chamber and a high electrostatic potential on the chamber wall. However, it has been determined that the screen structure material builds up on the conductive sidewall of the inner chamber in the form of "snow banks" of agglomerated particles, which may give rise to large agglomerated particles on the screen if the particles become dislodged from the sidewall. Thus, it is desirable that the drawbacks of the prior developing apparatus be addressed and eliminated.

SUMMARY OF THE INVENTION

In accordance with the present invention, a method is disclosed for developing an electrostatic latent charge image which is formed on a photoreceptor that is disposed on an interior surface of a faceplate panel of a CRT. The method utilizes a developer tank having a sidewall closed at one end by a bottom portion and at the other end by a panel support having an opening therethrough to provide access to the panel. A panel grid is disposed in proximity to the interior surface of the faceplate panel and operated at a first potential to control the electric field from the latent charge image. A tank grid is disposed within the developer tank and spaced from the sidewall, the bottom and the panel grid. A triboelectric gun assembly is disposed within the developer tank for imparting a desired charge polarity to the screen structure material and for distributing the charged screen structure material onto the latent charge image. Means for monitoring the deposition of the charged screen structure material onto the latent charge image and means for terminating the deposition of the charged screen structure material are provided. The novelty resides in operating the tank grid at a potential different from the potential on the panel grid so that the tank grid controls the electrostatic forces within the developer tank.

DETAILED DESCRIPTION OF THE PREFERRED EMBODIMENT

Figure 1:
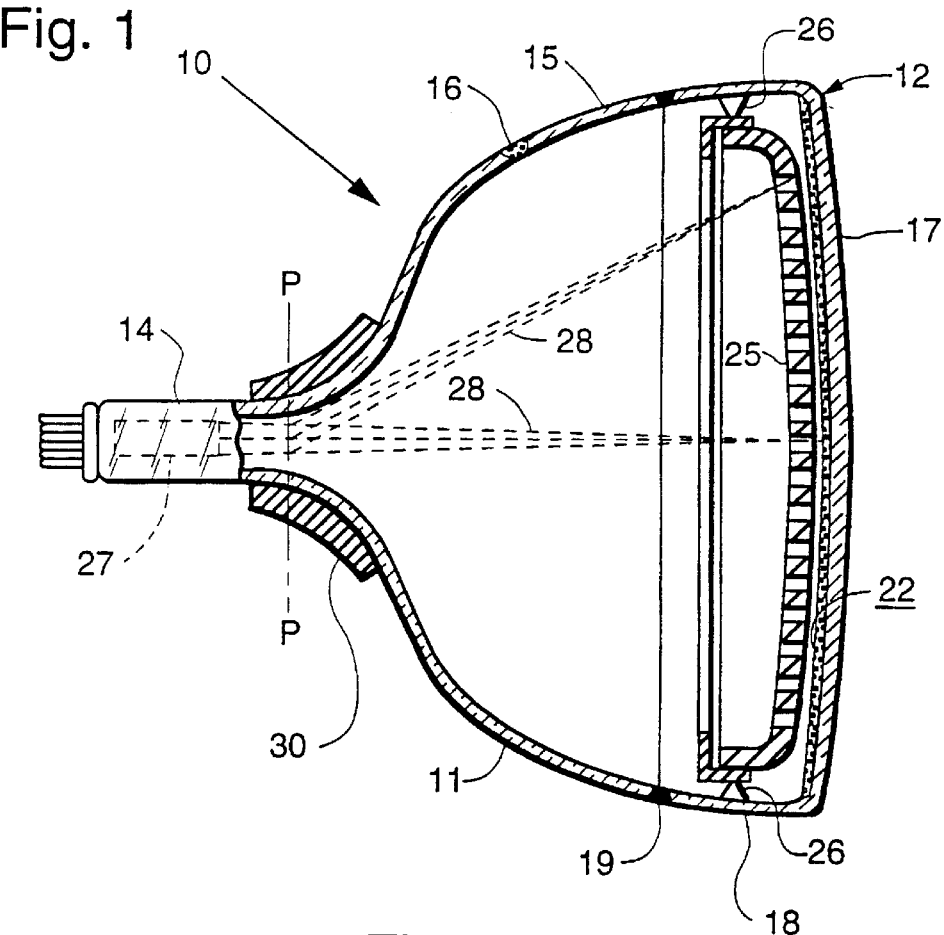
FIG. 1 is a plane view, partially in axial section, of a color CRT made according to the present method.
Figure 2:
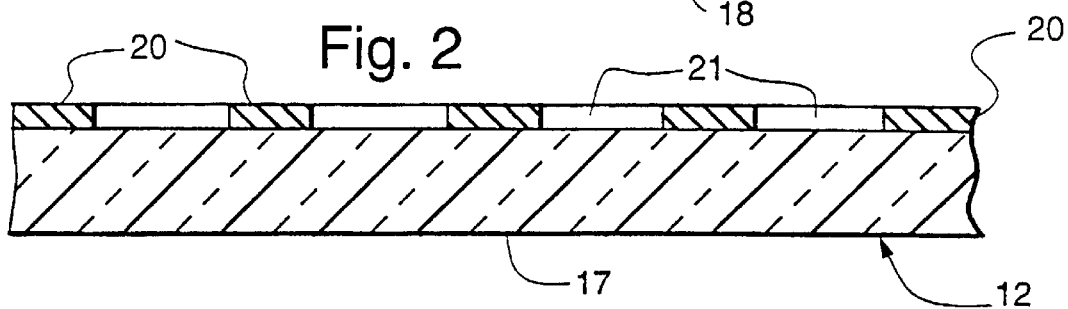
FIG. 2 is a section of a CRT faceplate panel with a matrix on an interior surface thereof during one step of the manufacturing process.

FIG. 1 shows a color CRT 10 having a glass envelope 11 comprising a rectangular faceplate panel 12 and a tubular neck 14 connected by a rectangular funnel 15. The funnel 15 has an internal conductive coating (not shown) that contacts an anode button 16 and extends into the neck 14. The panel 12 comprises a viewing faceplate 17 and a peripheral flange or sidewall 18, which is sealed to the funnel 15 by a glass frit 19. As shown in FIG. 2, a relatively thin, light absorbing matrix 20, having a plurality of openings 21, is provided on an interior surface of the viewing faceplate 17. A luminescent three color phosphor screen 22 is carried on the interior surface of the faceplate 17 and overlies the matrix 20. The screen 22, shown in FIG. 3, preferably, is a line screen which includes a multiplicity of screen elements comprised of red-, blue-, and green-emitting phosphor stripes, R, B, and G, centered in different ones of the matrix openings 21 and arranged in color groups or picture elements of three stripes or triads, in a cyclic order. The stripes extend in a direction which is generally normal to the plane in which the electron beams are generated. In the normal viewing position of the embodiment, the phosphor stripes extend in the vertical direction. Preferably, portions of the phosphor stripes overlap at least a portion of the light absorptive matrix 20 surrounding the openings 21. Alternatively, a dot screen also may be utilized. A thin conductive layer 24, preferably of aluminum, overlies the screen 22 and provides means for applying a uniform potential to the screen, as well as for reflecting light, emitted from the phosphor elements, through the faceplate 17. The screen 22 and the overlying aluminum layer 24 comprise a screen assembly. Again with reference to FIG. 1, a multi-apertured color selection electrode, such as a shadow mask or focus mask, 25 is removably mounted, by conventional means, in predetermined spaced relation to the screen assembly. The color selection electrode 25 is detachably attached to a plurality of studs 26 embedded in the sidewall 18 of the panel 12.

An electron gun 27, shown schematically by the dashed lines, is centrally mounted within the neck 14, to generate and direct three electron beams 28 along convergent paths, through the apertures in the color selection electrode 25, to the screen 22. The electron gun is conventional and may be any suitable gun known in the art.

The tube 10 is designed to be used with an external magnetic deflection yoke, such as yoke 30, located in the region of the funnel-to-neck junction. When activated, the yoke 30 subjects the three beams 28 to magnetic fields which cause the beams to scan horizontally and vertically, in a rectangular raster, over the screen 22. The initial plane of deflection (at zero deflection) is shown by the line P—P in FIG. 1, at about the middle of the yoke 30. For simplicity, the actual curvatures of the deflection beam paths, in the deflection zone, are not shown.

Figure 4:
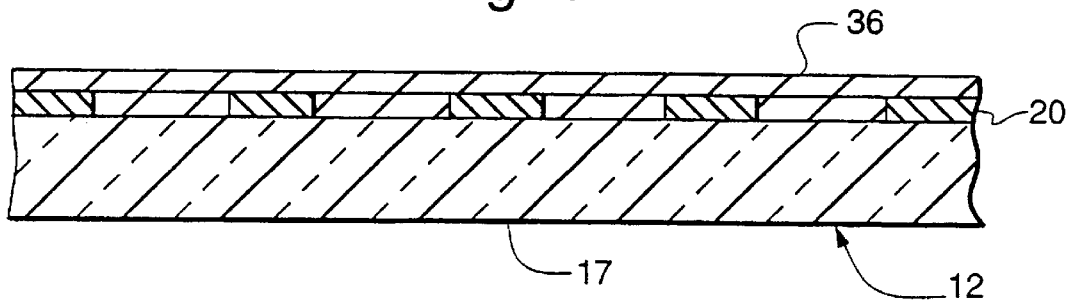
FIG. 4 is a section of the CRT faceplate panel showing a photoreceptor overlying the matrix during another step of the manufacturing process.

The screen 22 is manufactured by an electrophotographic screening (EPS) process that is described in U.S. Pat. No. 4,921,767, issued to Datta et al. on May 1, 1990. Initially, the panel 12 is cleaned by washing it with a caustic solution, rinsing it in water, etching it with buffered hydrofluoric acid and rinsing it again with water, as is known in the art. The interior surface of the viewing faceplate 17 is then provided with the light absorbing matrix 20, preferably, using the conventional wet matrix process described in U.S. Pat. No. 3,558,310, issued to Mayaud on Jan. 26, 1971. In the wet matrix process, a suitable photoresist solution is applied to the interior surface, e.g., by spin coating, and the solution is dried to form a photoresist layer. Then, the color selection electrode 25 is inserted into the panel 12 and the panel is placed onto a three-in-one lighthouse (not shown) which exposes the photoresist layer to actinic radiation from a light source which projects light through the openings in the color selection electrode. The exposure is repeated two more times with the light source located to simulate the paths of the electron beams from the three electron guns. The light selectively alters the solubility of the exposed areas of the photoresist layer. After the third exposure, the panel is removed from the lighthouse and the color selection electrode is removed from the panel. The photoresist layer is developed, using water, to remove the more soluble areas thereof, thereby exposing the underlying interior surface of the viewing faceplate, and leaving the less soluble, exposed areas of the photoresist layer intact. Then, a suitable solution of light-absorbing material is uniformly provided onto the interior surface of the faceplate panel to cover the exposed portion of the viewing faceplate and the retained, less soluble, areas of the photoresist layer. The layer of light-absorbing material is dried and developed using a suitable solution which will dissolve and remove the retained portion of the photoresist layer and the overlying light-absorbing material, forming openings 21 in the matrix 20 which is adhered to the interior surface of the viewing faceplate. For a panel 12 having a diagonal dimension of 51 cm (20 inches), the openings 21 formed in the matrix 20 have a width of about 0.13 to 0.18 mm, and the opaque matrix lines have a width of about 0.1 to 0.15 mm. The interior surface of the viewing faceplate 17, having the matrix 20 thereon, is then coated with a suitable layer of a volatilizable, organic conductive (OC) material, not shown, which provides an electrode for an overlying volatilizable, organic photoconductive (OPC) layer, also not shown. The OC layer and the OPC layer, in combination, comprise a photoreceptor 36, shown in FIG. 4.

Suitable materials for the OC layer include certain quaternary ammonium polyelectrolytes described in U.S. Pat. No. 5,370,952, issued to P. Datta et al. on Dec. 6, 1994. Preferably, the OPC layer is formed by coating the OC layer with a solution containing polystyrene; an electron donor material, such as 1,4-di(2,4-methyl phenyl)-1,4 diphenylbutatriene (2,4-DMPBT); electron acceptor materials, such as 2,4,7-trinitro-9-fluorenone (TNF) and 2-ethylanthroquinone (2-EAQ); and a suitable solvent, such as toluene, xylene, or a mixture of toluene and xylene. A surfactant, such as silicone U-7602 and a plasticizer, such as dioctyl phthalate (DOP), also may be added to the solution. The surfactant U-7602 is available from Union Carbide, Danbury, Conn. The photoreceptor 36 is uniformly electrostatically charged using a corona discharge device (not shown), but described in U.S. Pat. No. 5,519,217, issued on May 21, 1996, to Wilbur et al., which charges the photoreceptor 36 to a voltage within the range of approximately +200 to +700 volts. The color selection electrode 25 is then inserted into the panel 12, which is placed onto a lighthouse (also not shown) and the positively charged OPC layer of the photoreceptor 36 is exposed, through the color selection electrode 25, to light from a xenon flash lamp, or other light source of sufficient intensity, such as a mercury arc, disposed within the lighthouse. The light which passes through the apertures in the color selection electrode 25, at an angle identical to that of one of the electron beams from the electron gun of the tube, discharges the illuminated areas on the photoreceptor 36 and forms a latent charge image (not shown). The color selection electrode 25 is removed from the panel 12 and the panel is placed onto a first phosphor developer 40, such as that shown in FIG. 5.

The developer 40 comprises a developing chamber 42 having a bottom end 44 and a top end, or panel support, 46. The panel support 46, preferably, is formed of insulative material and includes an opening 48 therethrough which is slightly smaller in dimensions than the CRT faceplate panel 12. The panel 12 is supported on the panel support 46. The developing chamber 42 further includes a exterior sidewall 50 that extends between the bottom end 44 and the panel support 46. A conductive interior sidewall 52 is spaced from the exterior sidewall 50 and extends from a conductive interior bottom end 54 to a plane A—A adjacent to the panel support 46. The conductive interior sidewall 52 and bottom end 54 form a tank grid 56 which is connected to a high voltage source 55 and biased at a potential of at least 2 kV volts, but preferably within the range of 3 to 15 kV to repel the positively-charged cloud of phosphor particles within the chamber 42 and provide control of the cloud. A gap 57, located at the top periphery of the chamber 42, between the exterior and interior sidewalls 50 and 52, provides a path to remove excess phosphor particles that are not deposited onto the latent charge image formed on the photoreceptor 36. An exhaust port 58 is connected to a pump (not shown) to remove the excess phosphor particles from the developer 40.

An electrical contact, such as a stud contact spring, 60 is provided to contact one of the studs 26 embedded in the sidewall 18 of the faceplate panel 12. The conductive coating of the photoreceptor 36 is electrically connected, by means of a contact patch (not shown), to the stud 26. The contact patch is described in U.S. Pat. No. 5,156,770, issued to Wetzel et al. on Oct. 20, 1992. The electrical contact 60 is connected to, and grounded through, a capacitor 64 which develops a voltage proportional to the charge of the triboelectrically-charged phosphor particles deposited on the latent charge image on the photoreceptor 36. The voltage developed on the capacitor 64 is monitored by an electrometer 66 and is connected to a controller 68 which is programmed to terminate the phosphor deposition when the voltage reaches a predetermined value that corresponds to the required phosphor thickness. Prior to each development cycle, the voltage on the capacitor 64 is discharged to ground through a contact 70, by action of the controller 68. A high voltage source 72 is connected to a panel grid 74 to control the electric field in the vicinity of the latent charge image formed on the photoreceptor 36. The structure and function of the panel grid 74 is described in U.S. Pat. No. 5,093,217, issued on Mar. 3, 1992, to Datta et al. The grid 74 is positively biased at about 2 to 3 kV and has the same polarity as that of the triboelectrically-charged phosphor particles being deposited onto the latent charge image.

A separate developer 40 is required for each of the three color emissive phosphors, to prevent cross contamination which would otherwise occur if a single developer were utilized and different color emitting phosphors materials were fed into a common chamber. External to the developing chamber 42 is a phosphor reservoir 76 which contains a supply of dry-powdered phosphor particles.

Figure 3:
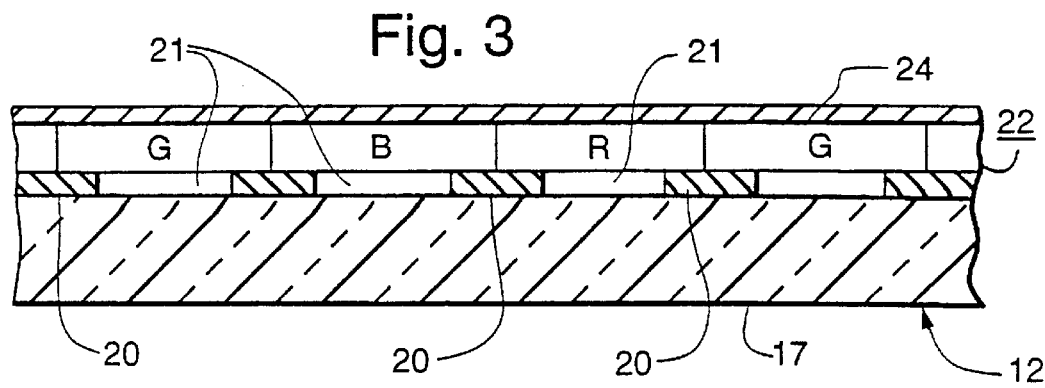
FIG. 3 is a section of a completed screen assembly of the tube shown in FIG. 1.

During the developing operation, the phosphor particles are transported from the reservoir 76 to a venturi chamber 78 where the phosphor particles are mixed with a suitable quantity of air. The actuation of the air supply is accomplished by opening a valve 80 that is controlled by the controller 68. The air pressure is set by a pressure regulator 82. The phosphor particles are carried into the chamber 42 and through a triboelectric gun 84, where the phosphor particles are positively triboelectrical-charged and directed toward the latent charge image on the photoreceptor 36. The positively charged first color-emitting phosphor particles are repelled by the positively charged areas on the photoreceptor 36 and deposited onto the discharged areas thereof by the process known in the art as "reversal" development. In reversal development, triboelectrically charged particles of screen structure material are repelled by similarly charged-areas of the photoreceptor 36 and deposited onto the discharged areas thereof The phosphor lines of the first color-emitting phosphor are deposited within selected ones of the openings 21 in the matrix 20 and build in width and height from the center of the openings 21 to the edges of the surrounding matrix. When the deposition is complete, it is necessary that the phosphor lines be slightly larger than the size of the openings 21 in the light-absorbing matrix 20, as shown in FIG. 3, to complete fill each of the openings, and slightly overlap the light-absorbing matrix surrounding the openings.

Figure 5:
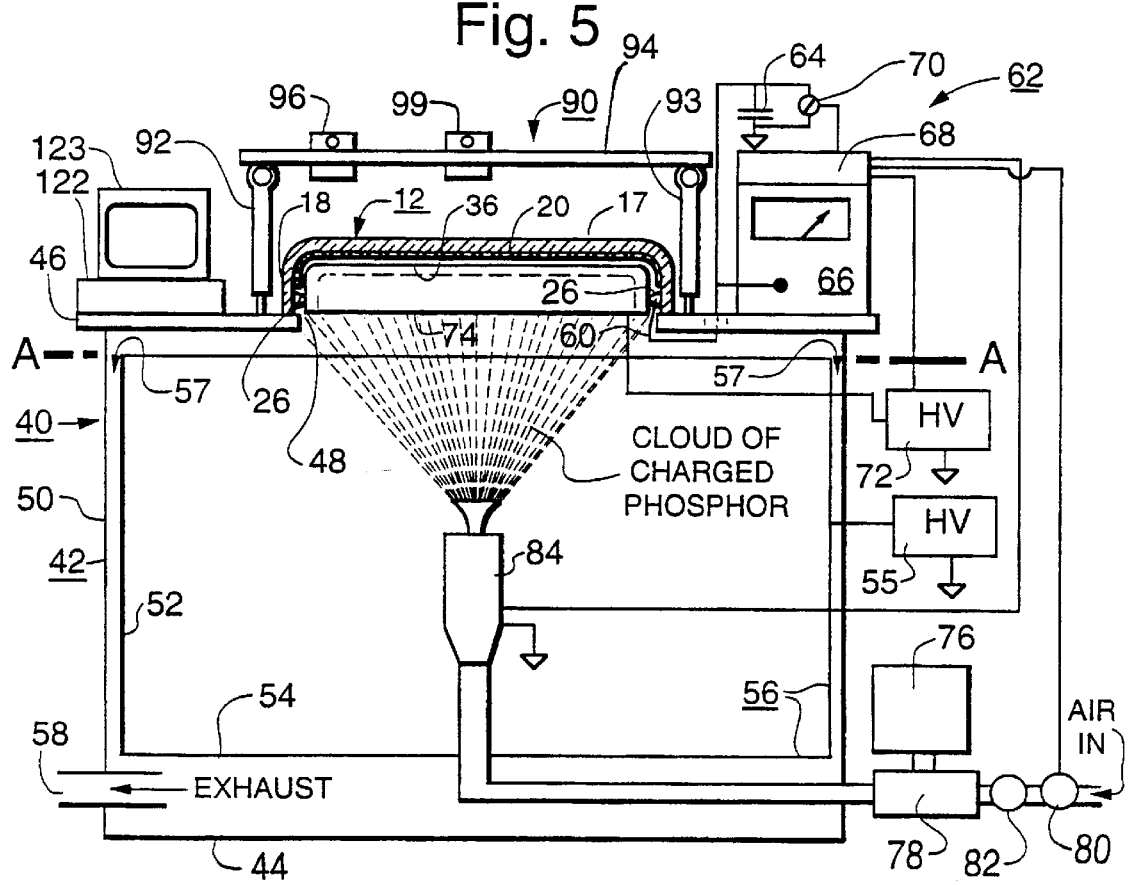
FIG. 5 a front view of a developing apparatus utilized in the present method.

With reference to FIG. 5, a phosphor deposition monitor (PDM) apparatus 90 includes a support assembly having a pair of side rails 92 and 93 that are mounted to the support surface 46 of the developer 40, adjacent to the opening 48. The side rails 92 and 93 are sufficiently spaced apart to permit a faceplate panel 12 to be positioned on the support surface 46 without interference from the side rails. A first pair of cross rails 94, only one of which is shown, are slidingly attached to the side rails 92 and 93 and support a first imaging device 96 that is slidingly attached to the cross rails 94. A second imaging device 99 also is slidingly attached to the cross rails 94. The imaging devices, 96 and 99, are mounted about 15 cm (6 inches) above the viewing faceplate 17. Each of the imaging devices 96 and 99 are movable in the x-y plane and can be tilted to be substantially parallel to the curvature of the viewing faceplate 17. The imaging devices 96 and 99 can be positioned anywhere above the viewing faceplate 17 and provide a visual means of monitoring the deposition of the phosphors screen structure materials. The PDM apparatus 90 is described in commonly owned, U.S. patent application, Ser. No. 728, 010, filed on Oct. 9, 1996, by Roberts, Jr., et al., now U.S. Pat. No. 5,790,913.

In the present process, the potential exerted on the charged phosphor cloud is dominated by the potentials on the tank grid 56 and the panel grid 74. The tank grid voltage can be adjusted within the range of 3–15 kV to control the electrostatic forces within the developing chamber 42, thereby optimizing the development process and the uniformity of the phosphor flux in the powder cloud.

Another advantage of the tank grid 56 is that it can be utilized to remove accumulated phosphor from the panel grid by "reverse" biasing both grids, i.e., biasing the grids 56 and 74 with negative voltages so that phosphor particles can be drawn from the panel grid 74 into the developer tank 40 where they can be removed through the exhaust port 58.

While described in the embodiment of a phosphor developer, the present invention also can be utilized for electrostatic spray applications of aerosols such as fixant materials that are sprayed onto EPS deposited phosphors screens to improve the adherence of the phosphors to the underlying photoreceptor and planarizing films, such as the layers comprising the photoconductor that are deposited onto the matrix layer.

What is claimed is:

1. A method for developing, with suitably triboelectrically-charged, dry powdered, screen structure material, an electrostatic latent charge image formed on a photoreceptor which is disposed on an interior surface of a faceplate panel of a CRT, using a developing apparatus comprising a developing chamber having a sidewall closed at one end by a bottom portion and at the other end by a panel support having an opening therethrough to provide access to said faceplate panel;

a panel grid in proximity to said interior surface of said faceplate panel;

a tank grid disposed within said developing chamber and spaced from said sidewall, said bottom and said panel grid;

a triboelectric gun for imparting a desired charge polarity to said screen structure material and for distributing said charged screen structure material onto said latent charge image;

means, for monitoring the deposition of said charged screen structure material onto said latent charge image; and means for terminating the deposition of said charged screen structure material, wherein said method includes the steps of operating said panel grid at a first potential to control an electric field from said latent charge image and operating said tank grid at a second potential, different from said first potential, to control the electrostatic forces within said developer tank.

2. The method as described in claim 1, wherein said second potential is greater than said first potential.

3. The method as described in claim 2, wherein said first potential is about 2 kV.

4. The method as described in claim 2, wherein said second potential is within the range of about 3 to 15 kV.

\* \* \* \* \*